US012783539B2

(12) United States Patent
Izquierdo Munoz

(10) Patent No.: US 12,783,539 B2
(45) Date of Patent: Nov. 3, 2026

(54) DATABASE INTEGRATION FOR DATA EXTRACTION AND TRANSFORMATION INTO A STANDARDIZED FORMAT FOR ANALYSIS

(71) Applicant: Truist Bank, Charlotte, NC (US)

(72) Inventor: Lucero Isabel Izquierdo Munoz, Plano, TX (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 19/042,320

(22) Filed: Jan. 31, 2025

(65) Prior Publication Data

US 2026/0178602 A1 Jun. 25, 2026

(51) Int. Cl.
*G06F 16/25* (2019.01)

(52) U.S. Cl.
CPC .................................. *G06F 16/254* (2019.01)

(58) Field of Classification Search
CPC ..................................................... G06F 16/254
See application file for complete search history.

(56) References Cited

U.S. PATENT DOCUMENTS 9,805,338 B1 * 10/2017 Ghosn .................... G06Q 30/08
2003/0055796 A1 * 3/2003 Shetty ...................... G06N 3/09 706/41
2021/0304008 A1 * 9/2021 Kaplan .................. G06N 20/00
2024/0281419 A1 * 8/2024 Alfaras ................ G06F 16/215

* cited by examiner

*Primary Examiner* — Charles D Adams
(74) *Attorney, Agent, or Firm* — Michael A. Springs, Esq.; Shumaker, Loop & Kendrick, LLP; Patrick B. Horne

(57) ABSTRACT

Systems and methods receive, from client application(s), request(s) to access data from platforms, translate the request(s) to API calls, the translating utilizing access protocols of each of the respective platforms. The data are retrieved and aggregated from data sources of each of the platforms, the data being aggregated into a standardized format. The systems and methods ascertain which data fields of the aggregated and standardized data include information relevant for analysis, the ascertaining being based on predefined data categories. Accuracy of relevant data located in the data fields that include the information relevant for analysis is verified and the relevant data are incorporated, based on accuracy of the relevant data being verified, into data columns for display via a centralized graphical user interface dashboard. Display, via the centralized graphical user interface dashboard, of one or more graphical elements incorporating the relevant data is initiated.

20 Claims, 13 Drawing Sheets

700

1000

1100

Overview (By Month) | Funnel view | Detail

MORTGAGE QUALITY METRICS
DETAIL

Select a View: Marketing Channel    Select measure: (All)    2013    Click on the image to show/hide filters    Open Filters

| | Segment View Selection | Jan | Feb | Mar | Apr | May | Jun | Jul | Aug | Sep | Oct | Nov | Dec | Grand Total |
|---|---|---|---|---|---|---|---|---|---|---|---|---|---|---|
| App Starts | NULL | 1,486 | 1,402 | 1,409 | 1,290 | 1,085 | 926 | 1,023 | 1,031 | 1,297 | | | | 10,949 |
| | EMAIL CAMPAIGNS | 21 | 5 | 9 | 33 | 18 | 25 | 14 | 12 | 12 | | | | 149 |
| | EXTERNAL DISPLAY | | | | | | | 1 | 3 | 3 | | | | 7 |
| | NATURAL SEARCH | 341 | 331 | 363 | 355 | 299 | 247 | 268 | 244 | 327 | | | | 2,775 |
| | NONE | 3,397 | 3,225 | 3,669 | 3,611 | 3,081 | 2,863 | 2,908 | 2,982 | 2,876 | | | | 28,612 |
| | OTHER CAMPAIGNS | | | | | | | 1 | | | | | | 1 |
| | PAID SEARCH | 435 | 343 | 403 | 149 | 162 | 146 | 101 | 113 | 108 | | | | 1,960 |
| | PAID SOCIAL | | 1 | | | | 1 | 1 | 1 | 1 | | | | 5 |
| | REFERRING DOMAINS | 332 | 296 | 329 | 345 | 306 | 269 | 282 | 292 | 268 | | | | 2,719 |
| | TOTAL | 6,012 | 5,603 | 6,182 | 5,783 | 4,951 | 4,477 | 4,599 | 4,678 | 4,892 | | | | 47,177 |
| App Submits | NULL | 884 | 881 | 858 | 802 | 662 | 555 | 619 | 628 | 816 | | | | 6,705 |
| | EMAIL CAMPAIGNS | 5 | 2 | 6 | 14 | 8 | 10 | 4 | 4 | 5 | | | | 58 |
| | EXTERNAL DISPLAY | | | | | | | | | 1 | | | | 1 |
| | NATURAL SEARCH | 222 | 227 | 244 | 239 | 194 | 177 | 176 | 176 | 212 | | | | 1,867 |
| | NONE | 2,807 | 2,694 | 3,046 | 2,986 | 2,538 | 2,379 | 2,378 | 2,459 | 2,356 | | | | 23,643 |
| | OTHER CAMPAIGNS | | | | | | | | | | | | | |
| | PAID SEARCH | 219 | 159 | 227 | 69 | 68 | 62 | 39 | 47 | 53 | | | | 943 |
| | PAID SOCIAL | | 1 | | | | | | | | | | | 1 |
| | REFERRING DOMAINS | 260 | 238 | 266 | 248 | 234 | 214 | 217 | 245 | 214 | | | | 2,136 |
| | TOTAL | 4,397 | 4,202 | 4,647 | 4,358 | 3,704 | 3,397 | 3,433 | 3,559 | 3,657 | | | | 35,354 |
| App Complete | NULL | 196 | 207 | 195 | 220 | 206 | 187 | 199 | 209 | 353 | | | | 1,972 |
| | EMAIL CAMPAIGNS | | 1 | 1 | 2 | 3 | | | 1 | 2 | | | | 10 |
| | EXTERNAL DISPLAY | | | | | | | | | | | | | |
| | NATURAL SEARCH | 51 | 54 | 80 | 65 | 65 | 62 | 66 | 62 | 58 | | | | 563 |
| | NONE | 1,380 | 1,534 | 1,600 | 1,770 | 1,666 | 1,432 | 1,593 | 1,574 | 1,627 | | | | 14,176 |
| | OTHER CAMPAIGNS | | | | | | | | | | | | | |
| | PAID SEARCH | 8 | 12 | 9 | 8 | 10 | 6 | 5 | 8 | 9 | | | | 75 |
| | PAID SOCIAL | | | | | | | | | | | | | |
| | REFERRING DOMAINS | 115 | 129 | 135 | 151 | 153 | 133 | 125 | 156 | 147 | | | | 1,244 |
| | TOTAL | 1,750 | 1,937 | 2,020 | 2,216 | 2,103 | 1,820 | 1,988 | 2,010 | 2,196 | | | | 18,040 |
| Funded Accts | NULL | 35 | 42 | 56 | 58 | 58 | 46 | 69 | 47 | 51 | | | | 462 |

FIG. 11

DATABASE INTEGRATION FOR DATA EXTRACTION AND TRANSFORMATION INTO A STANDARDIZED FORMAT FOR ANALYSIS

TECHNICAL FIELD

The present invention relates generally to the field of platform integration and data extraction; and more particularly, embodiments of the invention relate to platform integration and data extraction for transforming the data into a standardized format for analysis.

BACKGROUND OF THE INVENTION

Aggregating data from different software platforms can present challenges due to the lack of standardization across the different platforms. Each platform often uses unique data structures, formats, and protocols, which can complicate the process of combining information. When data are aggregated from each of the different platforms, this can also introduce errors that can negatively impact analysis. Thus, a need exists for improved systems and methods to improve standardization and data verification processes.

SUMMARY

Shortcomings of the prior art are overcome, and additional advantages are provided through the provision of a computing system for database integration facilitating data extraction. The system includes at least one processor, a communication interface communicatively coupled to the at least one processor, and one or more memory devices storing executable code. Execution of the executable code causes the at least one processor to, at least in part, receive, from one or more client applications, one or more requests to access data from a plurality of platforms and translate the one or more requests to one or more application programming interface (API) calls, the translating utilizing one or more access protocols of each of the respective platforms of the plurality of platforms. The system also retrieves and aggregates the data from data sources of each of the plurality of platforms, the data being aggregated into a standardized format. In addition, the system ascertains which data fields of the aggregated and standardized data include information relevant for analysis, where the ascertaining is based on one or more predefined data categories. Accuracy of relevant data located in the data fields that include the information relevant for analysis is verified, and the system incorporates, based on accuracy of the relevant data being verified, the relevant data into data columns for display via a centralized graphical user interface dashboard. Display via the centralized graphical user interface dashboard, of one or more graphical elements incorporating the relevant data is initiated.

Additionally, disclosed herein is a computing system that includes at least one processor, a communication interface communicatively coupled to the at least one processor, and a memory device storing executable code that, when executed, causes the at least one processor to, at least in part, retrieve and aggregate data from data sources of each of a plurality of platforms, the data being aggregated into a standardized format and ascertain which data fields of the aggregated and standardized data include information relevant for analysis, the ascertaining being based on one or more predefined data categories. The system also verifies accuracy of relevant data located in the data fields that include the information relevant for analysis and incorporates, based on accuracy of the relevant data being verified, the relevant data into data columns for display via a centralized graphical user interface dashboard. Further, the system initiates display, via the centralized graphical user interface dashboard, of one or more graphical elements incorporating the relevant data.

Also disclosed herein is a computer-implemented method that includes, at least in part, receiving, from one or more client applications, one or more requests to access data from a plurality of platforms and translating the one or more requests to one or more application programming interface (API) calls, the translating utilizing one or more access protocols of each of the respective platforms of the plurality of platforms. In addition, the method includes retrieving and aggregating the data from data sources of each of the plurality of platforms, the data being aggregated into a standardized format and ascertaining which data fields of the aggregated and standardized data include information relevant for analysis, the ascertaining being based on one or more predefined data categories. Further, the method includes verifying accuracy of relevant data located in the data fields that include the information relevant for analysis and incorporating, based on accuracy of the relevant data being verified, the relevant data into data columns for display via a centralized graphical user interface dashboard. Display, via the centralized graphical user interface dashboard, of one or more graphical elements incorporating the relevant data is initiated.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION OF THE DRAWINGS

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

FIG. 11 depicts an example centralized graphical user interface dashboard of graphical elements, in accordance with an embodiment of the present invention;

DETAILED DESCRIPTION

Figure 1:
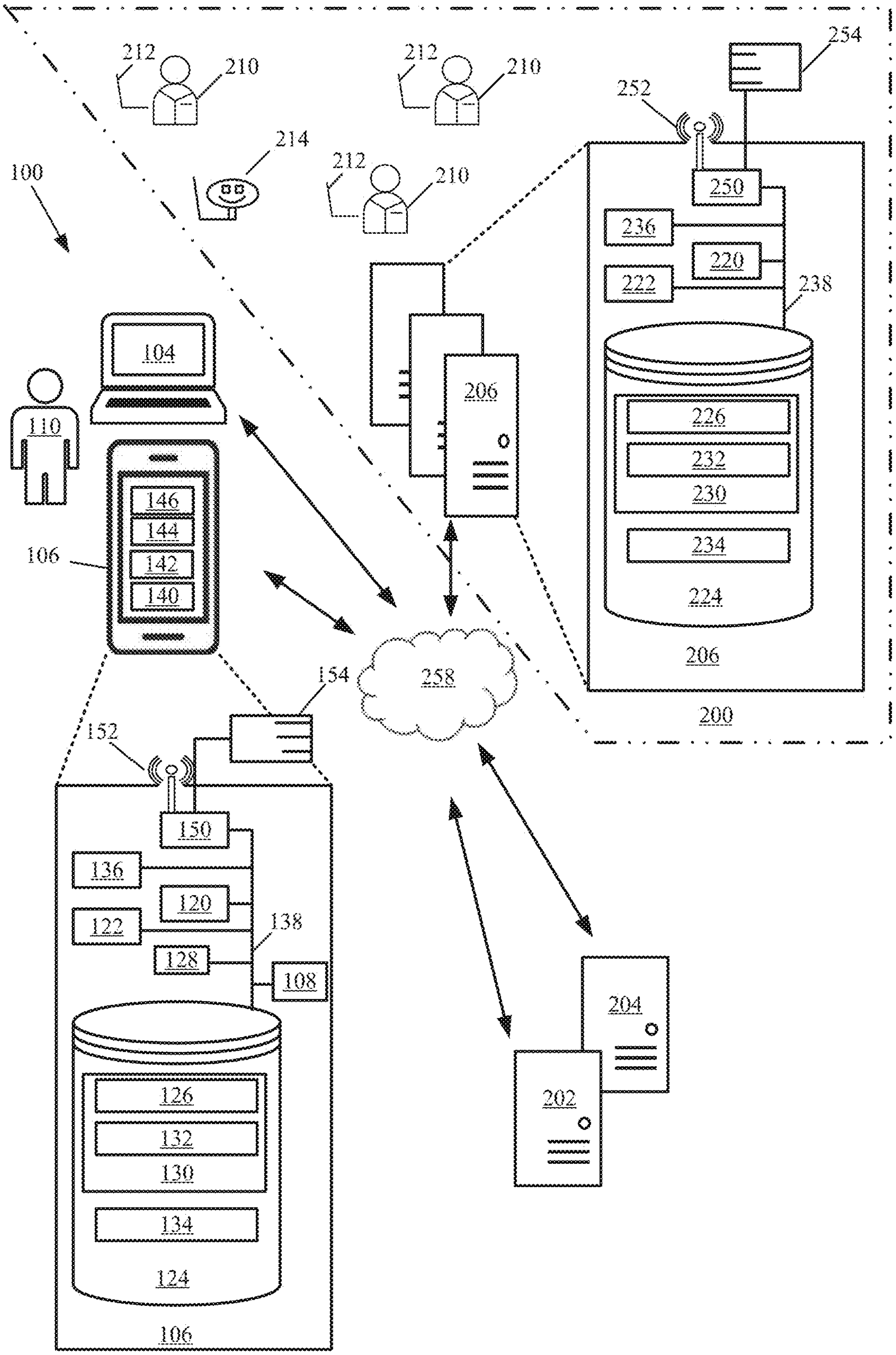
FIG. 1 illustrates an example computing environment of a computing system, in accordance with an embodiment of the present invention.

Aspects of the present invention and certain features, advantages, and details thereof are explained more fully below with reference to the non-limiting examples illustrated in the accompanying drawings. Descriptions of well-known processing techniques, systems, components, etc. are omitted so as to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

Unless described or implied as exclusive alternatives, features throughout the drawings and descriptions should be taken as cumulative, such that features expressly associated with some particular embodiments can be combined with other embodiments.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, which can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wide-band (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a micro-drive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing system 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated system 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to use various analytical tools (e.g., algorithmic applications) to leverage data to make predictions or decisions. Machine learning programs may be configured to implement various algorithmic processes and learning approaches including, for example, decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally, or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (DBSCAN), mean shift clustering, expectation maximization (EM) clustering using Gaussian mixture models (GMM), agglomerative hierarchical clustering, or the like. According to one embodiment, clustering of data may be performed using a cluster model to group data points based on certain similarities using unlabeled data. Example cluster models may include, for example, connectivity models, centroid models, distribution models, density models, group models, graph-based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short-term memory networks, as well as various other neural networks.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An artificial neural network (ANN), also known as a feedforward network, may be utilized, e.g., an acyclic graph with nodes arranged in layers. A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2A:
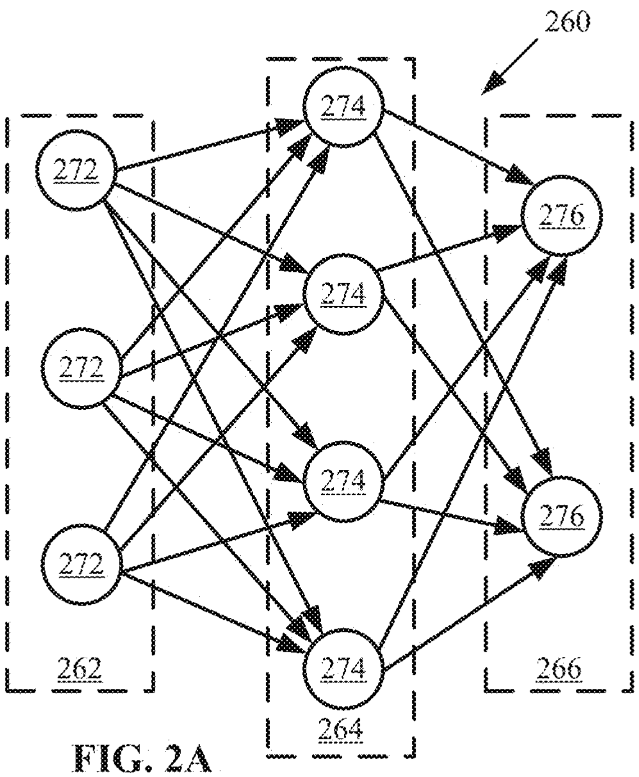
FIG. 2A is a diagram of a feedforward network, according to at least one embodiment, utilized in machine learning.
Figure 2C:
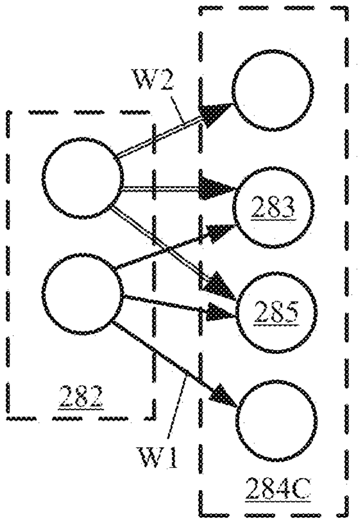
FIG. 2C is a diagram of a portion of the convolution neural network of FIG. 2B, according to at least one embodiment, illustrating assigned weights at connections or neurons.
Figure 2B:
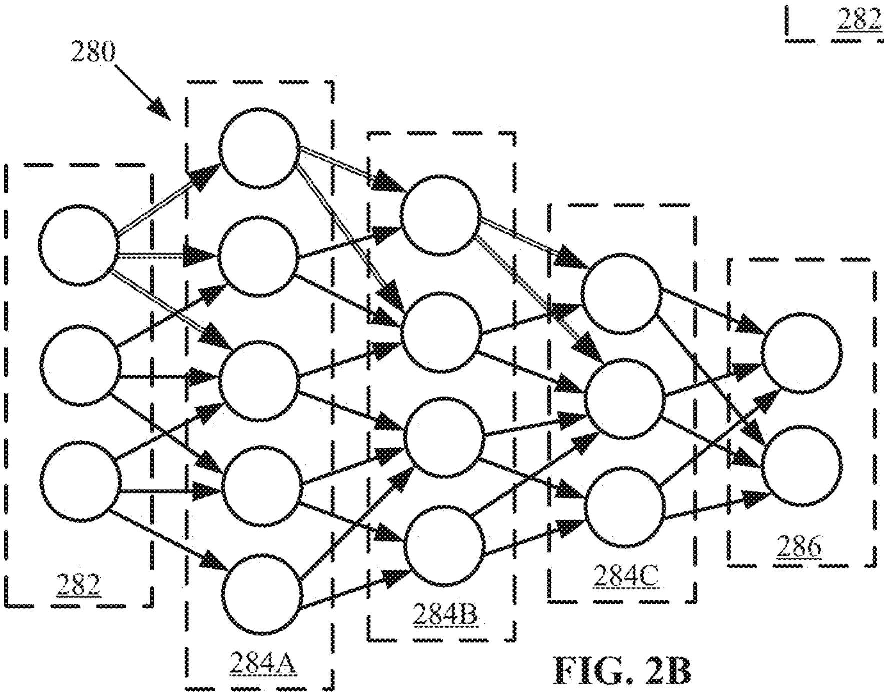
FIG. 2B is a diagram of a convolution neural network, according to at least one embodiment, utilized in machine learning.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However, where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
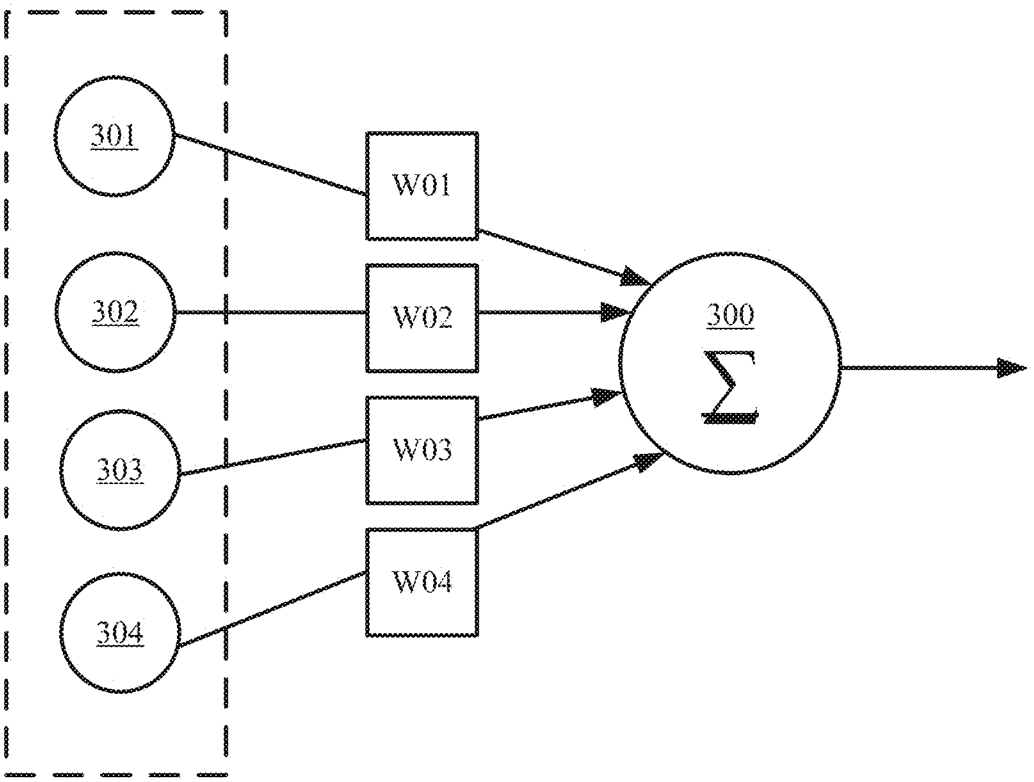
FIG. 3 is a diagram representing an exemplary weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 4:
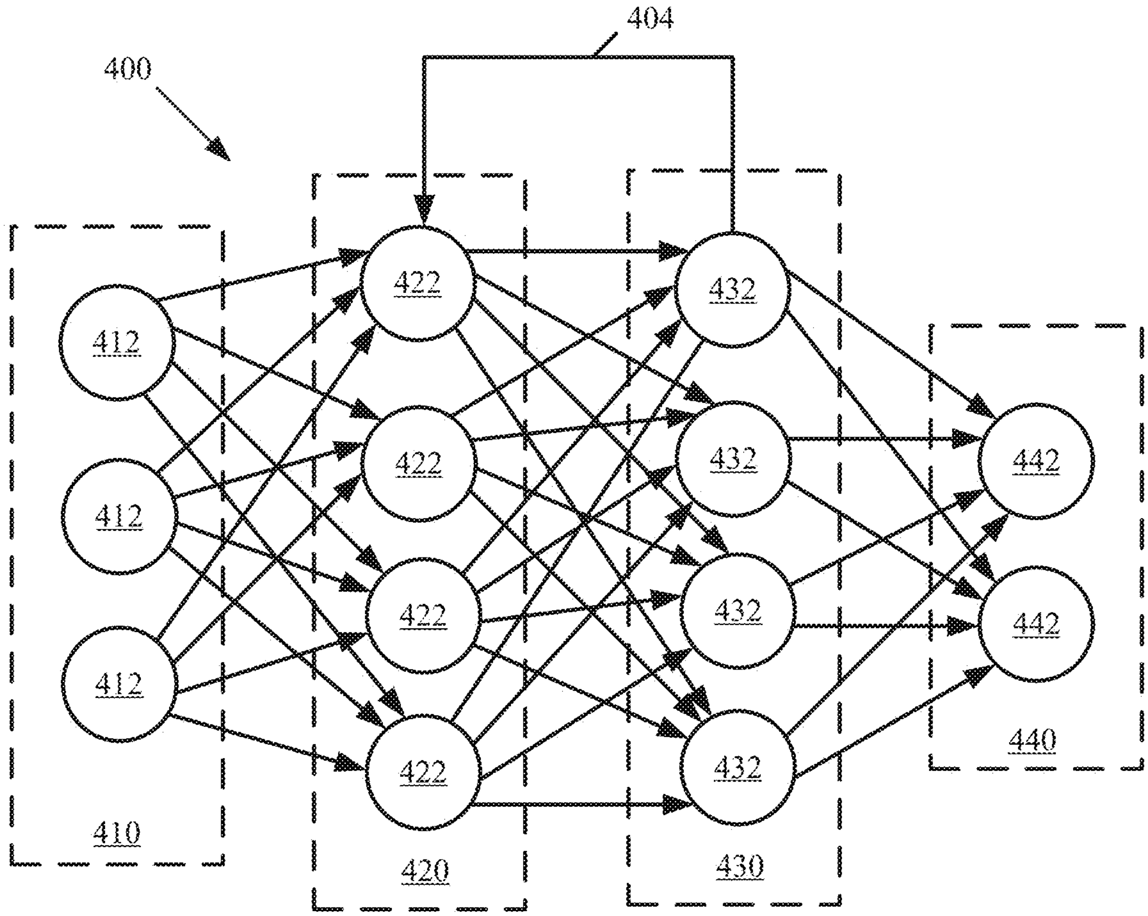
FIG. 4 is a diagram of a Recurrent Neural Network RNN, according to at least one embodiment, utilized in machine learning.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN 400. Moreover, and in some embodiments, the RNN 400 may include multiple feedback connectors 404 (e.g., connectors 404 suitable to communicatively couple pairs of nodes and/or connector systems 404 configured to provide communication between three or more nodes). Additionally, or alternatively, the feedback connector 404 may communicatively couple two or more nodes having at least one hidden layer between them, i.e., nodes of nonsequential layers of the RNN 400.

In an additional or alternative embodiment, the machine-learning program may include one or more support vector machines. A support vector machine may be configured to determine a category to which input data belongs. For example, the machine-learning program may be configured to define a margin using a combination of two or more of the input variables and/or data points as support vectors to maximize the determined margin. Such a margin may generally correspond to a distance between the closest vectors that are classified differently. The machine-learning program may be configured to utilize a plurality of support vector machines to perform a single classification. For example, the machine-learning program may determine the category to which input data belongs using a first support vector determined from first and second data points/variables, and the machine-learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine-learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine-learning program may include a relatively large number of layers, e.g., three or more layers, and may be referred to as deep neural networks. For example, the node of each hidden layer of a neural network may be associated with an activation function utilized by the machine-learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input/output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
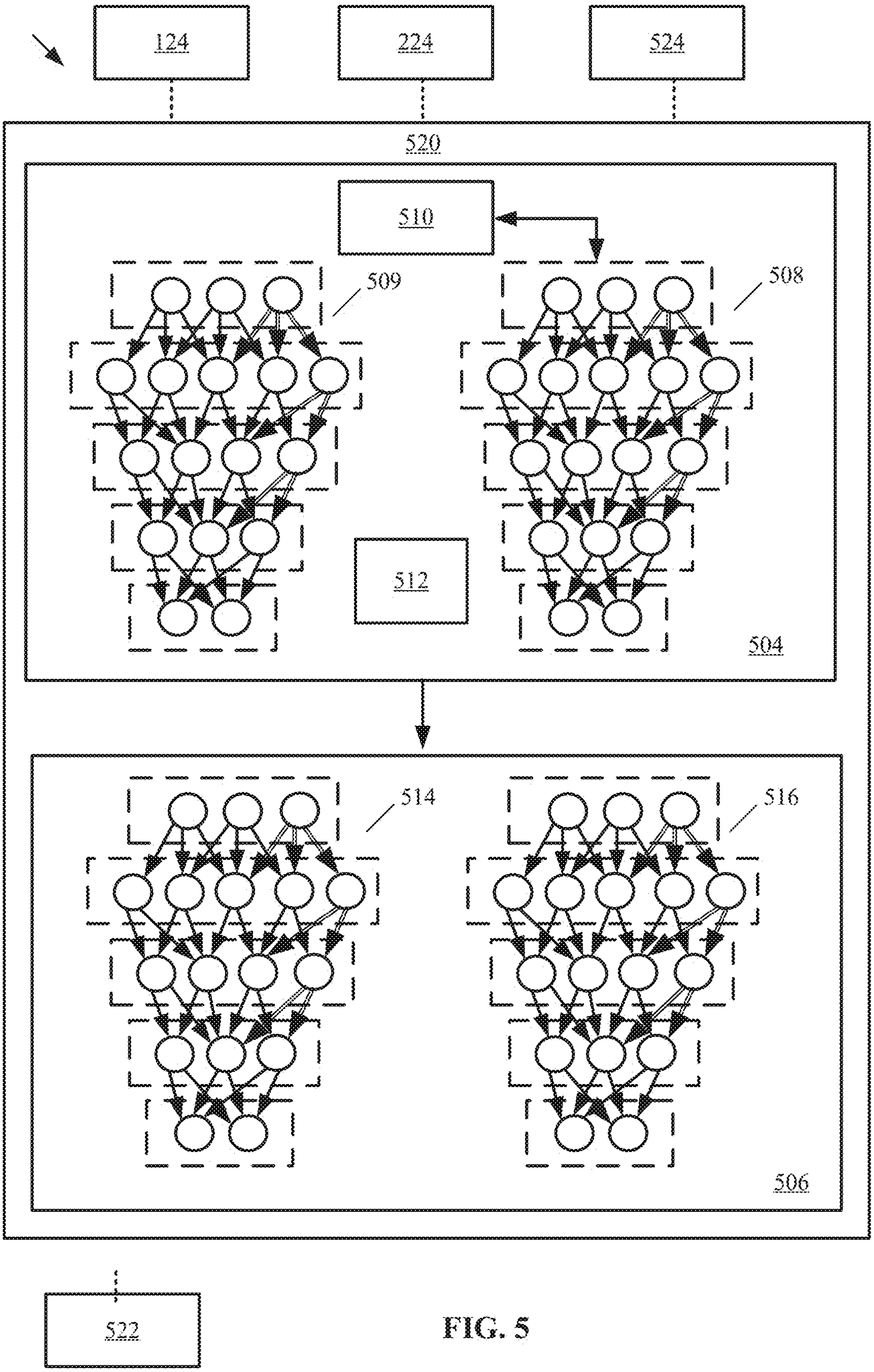
FIG. 5 is a schematic logic diagram of an artificial intelligence program including a front-end and a back-end algorithm.

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., storage device 124, memory device 122, storage device 224, and/or memory device 222) communicatively coupled to the AI processor 520, as shown. Additionally, or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end algorithm 504 configured to perform pre-processing, such as feature recognition, and a back-end algorithm 506 configured to perform an operation on the data set communicated directly or indirectly to the back-end algorithm 506 that together form the deep neural network). For instance, the front-end algorithm 504 can include at least one CNN 508 communicatively coupled to send output data to the back-end algorithm 506.

Additionally, or alternatively, the front-end algorithm 504 can include one or more AI algorithms 510, 512 (e.g., statistical models or machine learning programs such as decision tree learning, associate rule learning, recurrent artificial neural networks, support vector machines, and the like). In various embodiments, the front-end algorithm 504 may be configured to include built in training and inference logic or suitable software to train the neural network prior to use (e.g., machine learning logic including, but not limited to, image recognition, mapping and localization, autonomous navigation, speech synthesis, document imaging, or language translation such as natural language processing). For example, a CNN 508 and/or AI algorithm 510 may be used for image recognition, input categorization, and/or support vector training. In some embodiments and within the front-end algorithm 504, an output from an AI algorithm 510 may be communicated to a CNN 508 or 509, which processes the data before communicating an output from the CNN 508, 509 and/or the front-end algorithm 504 to the back-end algorithm 506. In various embodiments, the back-end algorithm 506 may be configured to implement input and/or model classification, speech recognition, translation, and the like. For instance, the back-end network 506 may include one or more CNNs (e.g., CNN 514) or dense networks (e.g., dense networks 516), as described herein.

For instance, and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end algorithm 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine-learning framework 522 (e.g., hardware). The machine learning framework may include an index of basic operations, subroutines, and the like (primitives) typically implemented by AI and/or machine learning algorithms. Thus, the AI program 502 may be configured to utilize the primitives of the framework 522 to perform some or all of the calculations required by the AI program 502. Primitives suitable for inclusion in the machine learning framework 522 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine-learning program may include variations, adaptations, and alternatives suitable to perform the operations necessary for the system, and the present disclosure is equally applicable to such suitably configured machine learning and/or artificial intelligence programs, modules, etc. For instance, the machine-learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine-learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

Figure 6:
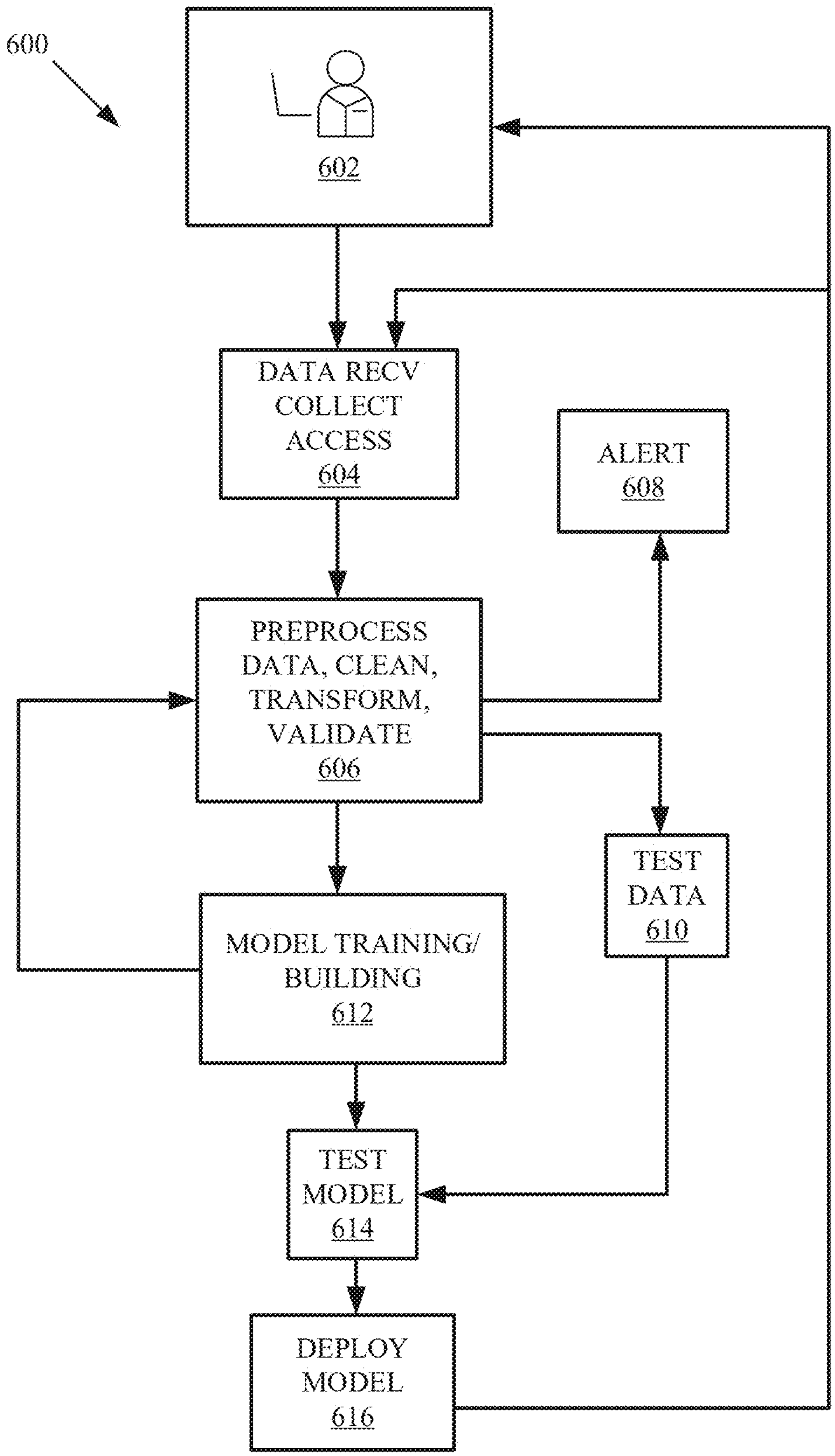
FIG. 6 is a flow chart representing a method, according to at least one embodiment, of model development and deployment by machine learning.

FIG. 6 is a flow chart representing a method 600, according to at least one embodiment, of model development and deployment by machine learning. The method 600 represents at least one example of a machine learning workflow in which steps are implemented in a machine-learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop. Such feedback may flow through a user, or in various embodiments, the method automatically provides feedback, retrains and redeploys the retrained model.

In step 604, data is received, collected, accessed, or otherwise acquired and entered as can be termed data ingestion. In step 606, the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning workflow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations. During each iteration of the training and testing loop, the accuracy of the model may be evaluated. In one embodiment, the re-evaluation of the model can include comparing an output of the model with an actual target result or variable to determine the accuracy of the prediction. If the model is not satisfying a minimum threshold level of accuracy (i.e., the model is underfitted), the system may automatically determine that the threshold level of accuracy is not satisfied and may adjust the weights for a subsequent iteration of the training and testing loop. The weights may be iteratively adjusted during each iteration of the training and testing loop based on the comparison to the threshold level of accuracy. However, there is a balance for training the model in order to avoid overfitting when the model would not perform well on predictions of new data. Rather, the model is automatically trained to be well-fitted such that it satisfies a threshold level of accuracy without learning the noise in the data to the extent that the model would not apply to new data by preventing additional iterations of the training and testing once a maximum accuracy threshold value has been obtained. Thus, with each iteration of the training and testing loop, the accuracy of the model is improved and the iterative training and testing of the model provides an improvement to the performance of a computer and computing technology because the system may automatically determine how many iterations to perform so that the model is well-fitted by surpassing the minimum threshold level of accuracy while automatically stopping the iterative training and testing of the model before the maximum accuracy threshold is obtained. In some embodiments, the training and testing loop utilizes a backpropagation algorithm and a gradient descent algorithm. Gradient descent is an optimization algorithm used to minimize differentiable real-valued multivariate functions. Gradient descent is an optimization algorithm used to minimize differentiable real-valued multivariate functions. The gradient descent algorithm may be used to iteratively adjust model parameters using calculated derivatives to minimize a loss function. Backpropagation may be used to calculate the gradient of the error function with respect to the neural network's weights.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

As discussed above, oversight of a deployed machine learning model may be automatically performed via a feedback loop whereby the method assesses performance of the deployed model (see step 616) and the feedback loop automatically provides feedback for further training of the machine learning model to improve its performance, and upon completion of the other method steps such as 612, the machine learning model that has been automatically retrained based on the feedback loop is then redeployed (step 614). In some embodiments, the system is continually receiving training data as new predictions are made and more data is collected. The continuous training data may be discretized to generate input data to retrain the model. Discretization methods can convert continuous data to discrete data by binning, clustering, and numerical discretization. The model may monitor incoming data sets to make predictions. When predictions are made the system analyzes the predictions to determine whether the model needs to be retrained.

In some embodiments, the model may detect anomalies in the predictions. Anomaly detection can provide a benefit by identifying instances of the prediction that deviate from expected data or a general pattern. A difficulty in anomaly detection is that the system must define the boundary between ordinary data and anomalous data to accurately classify the data as ordinary or anomalous. The line between ordinary and anomalous may be difficult to determine with cases approaching a boundary and based on the specific application. For example, small variations may trigger an identification of an anomaly in the data while relatively larger deviations may be considered normal in less sensitive applications. The disclosed systems and methods may provide solutions to detecting anomalies in order to more accurately and quickly determine whether a model needs to be retrained. If data would be inapplicable or would corrupt the model by reducing the quality of the input data or training process (e.g., due to missing values, outliers, inconsistent formatting, incorrect labels, noisy data, etc.) that data may be automatically dropped and the source of that data may be blocked from providing data that would be used to train the model. This reflects an improvement in the process of training and deploying a model that is accurate and specific to the type of prediction sought. In particular, this provides an improvement in the field of model training, which provides a practical application.

In other applications, the anomaly detections processes described herein may be used to provide enhanced security to the overall computing system by detecting compliance gaps such as vulnerabilities in system security. For example, the system may take proactive measures to remediate danger by rectifying the one or more compliance gaps to remedy the security vulnerability. For example, the system may identify compliance gaps associated with encryption requirements and may remedy the encryption process to reduce the likelihood that data may be compromised, which provides an improvement in network security.

The systems and methods disclosed herein may also be used to analyze text to form the predictions. In particular, the systems and methods described herein include a combination of elements that are utilized in a specific manner for automatically performing automated processes based on technological efficiency, which provides a specific improvement over prior art systems resulting in improved computer processing for faster automated processing functions. For example, the systems and method may apply process automation for digital transformation of the data based on specific criteria to interpret text and unstructured data using text processing software techniques. The interpretation of the text may be implemented using the models described herein including unsupervised learning techniques or supervised learning techniques. The processor may track how much memory and/or processing time has been allocated to perform a function and the system may be trained to automatically detect and identify processes eligible for increased efficiencies based on existing inefficiencies in the process.

For example, the machine learning models may use unsupervised learning to identify and characterize hidden structures of unstructured and unlabeled content data, or supervised techniques that operate on labeled content data and include instructions informing the system which outputs are related to specific input values. In such instances, software processing can rely on iterative training techniques and training data to configure neural networks with an understanding of individual words, phrases, subjects, sentiments, and parts of speech.

Supervised learning software systems are trained using content data that is labeled or "tagged." During training, the supervised software systems learn the best mapping function between a known data input and expected known output (i.e., labeled or tagged content data). Supervised natural language processing software then uses the best approximating mapping learned during training to analyze unforeseen input data (never seen before) to accurately predict the corresponding output. Supervised learning software systems often require extensive and iterative optimization cycles to adjust the input-output mapping until they converge to an expected and well-accepted level of performance, such as an acceptable threshold error rate between a calculated probability and a desired threshold probability.

The software systems are supervised because the way of learning from training data mimics the same process of a teacher supervising the end-to-end learning process. Supervised learning software systems are typically capable of achieving excellent levels of performance, but this excellent level of performance requires labeled data to be available. Developing, scaling, deploying, and maintaining accurate supervised learning software systems can take significant time, resources, and technical expertise from a team of skilled data scientists. Moreover, precision of the systems is dependent on the availability of labeled content data for training that is comparable to the corpus of content data that the system will process in a production environment.

Supervised learning software systems implement techniques that include, without limitation, Latent Semantic Analysis ("LSA"), Probabilistic Latent Semantic Analysis ("PLSA"), Latent Dirichlet Allocation ("LDA"), and more recent Bidirectional Encoder Representations from Transformers ("BERT"). Latent Semantic Analysis software processing techniques process a corporate of content data files to ascertain statistical co-occurrences of words that appear together, which then give insights into the subjects of those words and documents.

Unsupervised learning software systems can perform training operations on unlabeled data and less requirement for time and expertise from trained data scientists. Unsupervised learning software systems can be designed with integrated intelligence and automation to automatically discover information, structure, and patterns from content data. Unsupervised learning software systems can be implemented with clustering software techniques that include, without limitation, K-means clustering, Mean-Shift clustering, Density-based clustering, Spectral clustering, Principal Component Analysis, and Neural Topic Modeling ("NTM").

Clustering software techniques can automatically group semantically similar words together to accelerate the derivation and verification of an underneath common intent—i.e., ascertain or derive a new classification or subject, and not just classification into an existing subject or classification. Unsupervised learning software systems are also used for association rules mining to discover relationships between features from content data.

The content driver software service utilizes one or more supervised or unsupervised software processing techniques to perform a subject classification analysis to generate subject data. Suitable software processing techniques can include, without limitation, Latent Semantic Analysis, Probabilistic Latent Semantic Analysis, Latent Dirichlet Allocation. Latent Semantic Analysis software processing techniques generally process a corpus of alphanumeric text files, or documents, to ascertain statistical co-occurrences of words that appear together, which then give insights into the subjects of those words and documents. The content driver software service can utilize software processing techniques that include Non-Matrix Factorization, Correlated Topic Model ("CTM"), and K-Means or other types of clustering.

Neural networks may be trained using training set content data that comprise sample tokens, phrases, sentences, paragraphs, or documents for which desired subjects, content sources, interrogatories, or sentiment values are known. A labeling analysis may be performed on the training set content data to annotate the data with known subject labels, interrogatory labels, content source labels, or sentiment labels, thereby generating annotated training set content data. For example, a person can utilize a labeling software application to review training set content data to identify and tag or "annotate" various parts of speech, subjects, interrogatories, content sources, and sentiments.

The training set content data may then be fed to the content driver software service neural networks to identify subjects, content sources, or sentiments and the corresponding probabilities. For example, the analysis might identify that particular text represents a question with a 35% probability. If the annotations indicate the text is, in fact, a question, an error rate can be taken to be 65% or the difference between the calculated probability and the known certainty. Then parameters to the neural network are adjusted (i.e., constants and formulas that implement the nodes and connections between node), to increase the probability from 35% to ensure the neural network produces more accurate results, thereby reducing the error rate. The process is run iteratively on different sets of training set content data to continue to increase the accuracy of the neural network.

The content data is first pre-processes using a reduction analysis to create reduced content data. The reduction analysis first performs a qualification operation that removes unqualified content data that does not meaningfully contribute to the subject classification analysis. The qualification operation removes certain content data according to criteria defined by a provider. For instance, the qualification analysis can determine whether content data files are "empty" and contain no recorded linguistic interaction between a provider agent and a user and designate such empty files as not suitable for use in a subject classification analysis. As another example, the qualification analysis can designate files below a certain size below a given threshold (e.g., less than one minute) as also being unsuitable for use in the subject classification analysis.

The reduction analysis can also perform a contradiction operation to remove contradictions and punctuations from the content data. Contradictions and punctuation include removing or replacing abbreviated words or phrases that can cause inaccuracies in a subject classification analysis. Examples include removing or replacing the abbreviations “min” for minute, “u” for you, and “wanna” for “want to,” as well as apparent misspellings, such as “mssed” for the word missed. In some embodiments, the contradictions can be replaced according to a standard library of known abbreviations, such as replacing the acronym “brb” with the phrase “be right back.” The contradiction operation can also remove or replace contractions, such as replacing “we’re” with “we are.”

The reduction analysis can also streamline the content data by performing one or more of the following operations, including: (i) tokenization to transform the content data into a collection of words or key phrases having punctuation and capitalization removed; (ii) stop word removal where short, common words or phrases such as “the” or “is” are removed; (iii) lemmatization where words are transformed into a base form, like changing third person words to first person and changing past tense words to present tense; (iv) stemming to reduce words to a root form, such as changing plural to singular; and (v) hyponymy and hypernym replacement where certain words are replaced with words having a similar meaning so as to reduce the variation of words within the content data.

Following a reduction analysis, the reduced content data is vectorized to map the alphanumeric text into a vector form. One approach to vectorizing content data includes applying “bag-of-words” modeling. The bag-of-words approach counts the number of times a particular word appears in content data to convert the words into a numerical value. The bag-of-words model can include parameters, such as setting a threshold on the number of times a word must appear to be included in the vectors.

Techniques to encode the context communication elements (e.g., such as words, speech patterns, tone, timbre, cadence, etc.) may, in part, determine how often communication elements appear together. Determining the adjacent pairing of communication elements can be achieved by creating a co-occurrence matrix with the value of each member of the matrix counting how frequently one communication element coincides with another, either just before or just after it. That is, the words or communication elements form the row and column labels of a matrix, and a numeric value appears in matrix elements that correspond to a row and column label for communication elements that appear adjacent in the content data.

As an alternative to counting communication elements (e.g., words) in a corpus of content data and turning it into a co-occurrence matrix, another software processing technique may be used where a communication element in the content data corpus predicts the next communication element. Looking through a corpus, counts may be generated for adjacent communication elements, and the counts are converted from frequencies into probabilities (i.e., using n-gram predictions with Kneser-Ney smoothing) using a simple neural network. Suitable neural network architectures for such purpose include a skip-gram architecture. The neural network may be trained by feeding through a large corpus of content data, and embedded middle layers in the neural network are adjusted to best predict the next word.

The predictive processing creates weight matrices that densely carry contextual, and hence semantic, information from the selected corpus of content data. Pre-trained, contextualized content data embedding can have high dimensionality. To reduce the dimensionality, a uniform manifold approximation and projection algorithm (“UMAP”) can be applied to reduce dimensionality while maintaining essential information.

Prior to conducting a subject analysis to ascertain subject identifiers in the content data (i.e., topics or subjects addressed in the content data) or interaction driver identifiers in the content data (i.e., reasons why the customer initiated the interaction with the provider, such as the reason underlying a support request), the system can perform a concentration analysis on the content data. The concentration analysis concentrates, or increases the density of, the content data by identifying and retaining communication elements that have significant weight in the subject analysis and discarding or ignoring communication elements that have relativity little weight.

In one embodiment, the concentration analysis includes executing a term frequency-inverse document frequency (“tf-idf”) software processing technique to determine the frequency or corresponding weight quantifier for communication elements with the content data. The weight quantifiers are compared against a pre-determined weight threshold to generate concentrated content data that is made up of communication elements having weight quantifiers above the weight threshold.

The concentrated content data is processed using a subject classification analysis to determine subject identifiers (i.e., topics) addressed within the content data. The subject classification analysis can specifically identify one or more interaction driver identifiers that are the reason why a user initiated a shared experience or support service request. An interaction driver identifier can be determined by, for example, first determining the subject identifiers having the highest weight quantifiers (e.g., frequencies or probabilities) and comparing such subject identifiers against a database of known interaction driver identifiers.

In one embodiment, the subject classification analysis is performed on the content data using a Latent Dirichlet Allocation analysis to identify subject data that includes one or more subject identifiers (e.g., topics addressed in the underlying content data). Performing the LDA analysis on the reduced content data may include transforming the content data into an array of text data representing key words or phrases that represent a subject (e.g., a bag-of-words array) and determining the one or more subjects through analysis of the array. Each cell in the array can represent the probability that given text data relates to a subject. A subject is then represented by a specified number of words or phrases having the highest probabilities (i.e., the words with the five highest probabilities), or the subject is represented by text data having probabilities above a predetermined subject probability threshold.

Clustering software processing techniques include K-means clustering, which is an unsupervised processing technique that does not utilized labeled content data. Clusters are defined by “K” number of centroids where each centroid is a point that represents the center of a cluster. The K-means processing technique run in an iterative fashion where each centroid is initially placed randomly in the vector space of the dataset, and the centroid moves to the center of the points that is closest to the centroid. In each new iteration, the distance between each centroid and the points are recalculated, and the centroid moves again to the center of the closest points. The processing completes when the position or the groups no longer change or when the distance in which the centroids change does not surpass a pre-defined threshold.

The clustering analysis yields a group of words or communication elements associated with each cluster, which can be referred to as subject vectors. Subjects may each include one or more subject vectors where each subject vector includes one or more identified communication elements (i.e., keywords, phrases, symbols, etc.) within the content data as well as a frequency of the one or more communication elements within the content data. The content driver software service can be configured to perform an additional concentration analysis following the clustering analysis that selects a pre-defined number of communication elements from each cluster to generate a descriptor set, such as the five or ten words having the highest weights in terms of frequency of appearance (or in terms of the probability that the words or phrases represent the true subject when neural networking architecture is used). In one embodiment, the descriptor sets were analyzed to determine if the reasons driving a customer support request were identified by the descriptor set subject identifiers.

The software model may be evaluated according to three categories, including a "good match" where the support request reason(s) are identified by the top words in the subject vector (i.e., the words with the highest weight or frequency), a "moderate" match where the support request reason(s) are identified by the second tier of words in the subject vector (i.e., words six to ten), and a "poor" match where, for instance, the top words in a subject vector do not match or identify the reasons the support request was initiated.

Alternatively, instead of selecting a pre-determined number of communication elements, post-clustering concentration analysis can analyze the subject vectors to identify communication elements that are included in several subject vectors having a weight quantifier (e.g., a frequency) below a specified weight threshold level that are then removed from the subject vectors. In this manner, the subject vectors are refined to exclude content data less likely to be related to a given subject. To reduce an effect of spam, the subject vectors may be analyzed, such that if one subject vector is determined to include communication elements that are rarely used in other subject vectors, then the communication elements are marked as having a poor subject correlation and is removed from the subject vector.

In another embodiment, the concentration analysis is performed on unclassified content data by mapping the communication elements within the content data to integer values. The content data is thus turned into a bag-of-words that includes integer values and the number of times the integers occur in content data. The bag-of-words is turned into a unit vector, where all the occurrences are normalized to the overall length. The unit vector may be compared to other subject vectors produced from an analysis of content data by taking the dot product of the two-unit vectors. All the dot products for all vectors in a given subject are added together to provide a weighting quantifier or score for the given subject identifier, which is taken as subject weighting data. A similar analysis can be performed on vectors created through other processing, such as K-means clustering or techniques that generate vectors where each word in the vector is replaced with a probability that the word represents a subject identifier or request driver data.

In one example, text mapping may be applied to a data processing workflow to categorize the text to one or more topological vector spaces, wherein each respective vector space of the one or more topological vector spaces includes associated rule functions. A topological vector space is a vector space over a topological field that is provided with topological features of the text using underlying representations of words for text classification.

To illustrate generating subject weighting data, for any given subject there may be numerous subject vectors. Assume that for most of subject vectors, the dot product will be close to zero—even if the given content data addresses the subject at issue. Since there are some subjects with numerous subject vectors, there may be numerous small dot products that are added together to provide a significant score. Put another way, the particular subject is addressed consistently throughout a document, several documents, sessions of the content data, and the recurrence of the carries significant weight.

In another embodiment, a predetermined threshold may be applied where any dot product that has a value less than the threshold is ignored and only stronger dot products above the threshold are summed for the score. In another embodiment, this threshold may be empirically verified against a training data set to provide a more accurate subject analysis.

In another example, a number of subject identifiers may be substantially different, with some subjects having orders of magnitude fewer subject vectors than do other subjects. The weight scoring might significantly favor relatively unimportant subjects that occur frequently in the content data. To address this problem, a linear scaling on the dot product scoring based on the number of subject vectors may be applied. The result provides a correction to the score so that important but less common subjects are weighed more heavily.

Once all scores are calculated for all subjects, then subjects may be sorted, and the most probable subjects are returned. The resulting output provides an array of subjects and strengths. In another embodiment, hashes may be used to store the subject vectors to provide a simple lookup of text data (e.g., words and phrases) and strengths. The one or more subject vectors can be represented by hashes of words and strengths, or alternatively an ordered byte stream (e.g., an ordered byte stream of 4-byte integers, etc.) with another array of strengths (e.g., 4-byte floating-point strengths, etc.).

The content driver software service can also use term frequency-inverse document frequency software processing techniques to vectorize the content data and generating weighting data that weight words or particular subjects. The tf-idf is represented by a statistical value that increases proportionally to the number of times a word appears in the content data. This frequency is offset by the number of separate content data instances that contain the word, which adjusts for the fact that some words appear more frequently in general across multiple shared experiences or content data files. The result is a weight in favor of words or terms more likely to be important within the content data, which in turn can be used to weigh some subjects more heavily in importance than others. To illustrate with a simplified example, the tf-idf might indicate that the term "password" carries significant weight within content data. To the extent any of the subjects identified by a natural language processing analysis include the term "password," that subject can be assigned more weight by the content driver software service.

The content data can be visualized and subject to a reduction into two-dimensional data using a UMAP to generate a cluster graph visualizing a plurality of clusters. The content driver software service feeds the two-dimensional data into a DBSCAN and identify a center of each cluster of the plurality of clusters. The process may, using the two-dimensional data from the UMAP and the center of each cluster from the DBSCAN, apply a KNN to identify data points closest to the center of each cluster and shade each of the data points to graphically identify each cluster of the plurality of clusters. The processor may illustrate a graph on the display representative of the data points that are shaded following application of the KNN.

The content driver software service can also incorporate Part of Speech ("POS") tagging software code that assigns words a part of speech depending upon the neighboring words, such as tagging words as a noun, pronoun, verb, adverb, adjective, conjunction, preposition, or other relevant parts of speech. The content driver software service can utilize the POS tagged words to help identify questions and subjects according to pre-defined rules, such as recognizing that the word "what" followed by a verb is also more likely to be a question than the word "what" followed by a preposition or pronoun (e.g., "What is this?" versus "What he wants is an answer.").

POS tagging in conjunction with Named Entity Recognition ("NER") software processing techniques can be used by the content driver software service to identify various content sources within the content data. NER techniques are utilized to classify a given word into a category, such as a person, product, organization, or location. Using POS and NER techniques to process the content data allow the content driver software service to identify particular words and text as a noun and as representing a person participating in the discussion (e.g., a content source).

The systems and methods disclosed herein may utilize deployed models (i.e., machine learning models, neural networks, predictive models, etc.) to make predictions about text in order to perform data aggregation from a plurality of different platforms. The use of specially trained models realizes a number of improvements over traditional methods of data aggregation, including obtaining more relevant information for more accurate analysis and reporting. Advantageously, the systems improve data analysis techniques in the field of metric reporting. Further, the systems and methods disclosed herein lead to faster and more accurate automated data interpretation and enhanced metrics reporting processes.

Large enterprises, particularly those in the financial sector, have significant amounts of data associated with various customer activities. The various financial institutions utilize different hardware and software platforms to collect, store, and interpret data. Within each financial institution, there may even be different software platforms being used for different departments, tasks, workplace sites, branch locations, etc. Currently, management at these financial institutions are regularly monitoring trends and changes in customer behavior in order to understand what changes are occurring on a macro level in order to adjust company policies and procedures. However, using existing systems, the information available to management is oftentimes incomplete since information stored in separate locations on different systems are not timely or readily shared, consolidated, or available due to format inconsistencies across the different platforms. For example, in the context of a financial institution, obtaining data about mortgage processes may utilize data stored to a digital lending platform (e.g., Blend™), mortgage marketing platforms (e.g., Empower LO™), a customer experience management platform (e.g., Adobe™ Experience Platform), and/or various other platforms that each store data in a non-standardized format. The systems and methods disclosed herein facilitate integration across each of these disparate platforms in order to extract and aggregate data for analysis and reporting.

The systems and methods disclosed herein reflect an improvement in the functioning of a computer or an improvement to other technology or a technical field by enhancing the platform integration and data extractions processes by (i) retrieving data from a plurality of data sources where the data is stored in a non-standardized format by whichever hardware or software platform is being used by collecting, converting, consolidating data from the various data sources into a standardized format, (ii) storing the data retrieved from the plurality of data sources on centralized network-based storage devices of an entity, (iii) predicting, using a predictive engine that incorporates machine learning, one or more processes for efficiently formatting the data, (iv) interpreting the standardized data, and (v) generating a report of the data interpretation. In order to perform these improvements, the system translates requests for data to one or more application programming interface (API) calls, where the translating utilizes one or more access protocols of each platform.

In addition, the systems and methods disclosed herein may use trained machine learning models to ascertain which data fields of the aggregated and standardized data include information relevant for analysis, where the machine learning models interpret the text included in the data and categorize the data into one or more predefined data categories. AI models may also be used to evaluate and verify the accuracy of relevant data located in the data fields in order to ensure the information being identified for analysis is accurate. These processes improve existing predictive technologies because then enhance the relevance and accuracy of data used for analysis.

In addition, the systems and methods utilize a particular machine or manufacture such as, for example, a specialized computer workflow engine in order to access information from different platforms and store the information to centralized network-based storage devices. The specialized computer workflow engine is integral to effectuating the improvements disclosed herein by enhancing data standardization for interpretation and analysis. Further, the systems and methods disclosed herein utilize a combination of software and hardware that include, for example, a physical circuit, which is a machine or manufacture.

The systems and methods disclosed herein improve existing processes used in analysis and representation using a graphical user interface dashboard for mortgage data. Specifically, the graphical user interface dashboard incorporates an automated tableau that utilizes mortgage metrics retrieved from a plurality of databases that include data stored to a digital lending platform (e.g., Blend™), mortgage marketing platforms (e.g., Empower LO™), a customer experience management platform (e.g., Adobe™ Experience Platform), and/or various other platforms that each store data in a non-standardized format. By obtaining mortgage metrics from each platform, this provides greater insights on a macro level of the trends and success of various marketing campaigns. In addition, this provides a representation of the mortgage process in various marketing channels.

Figure 7:
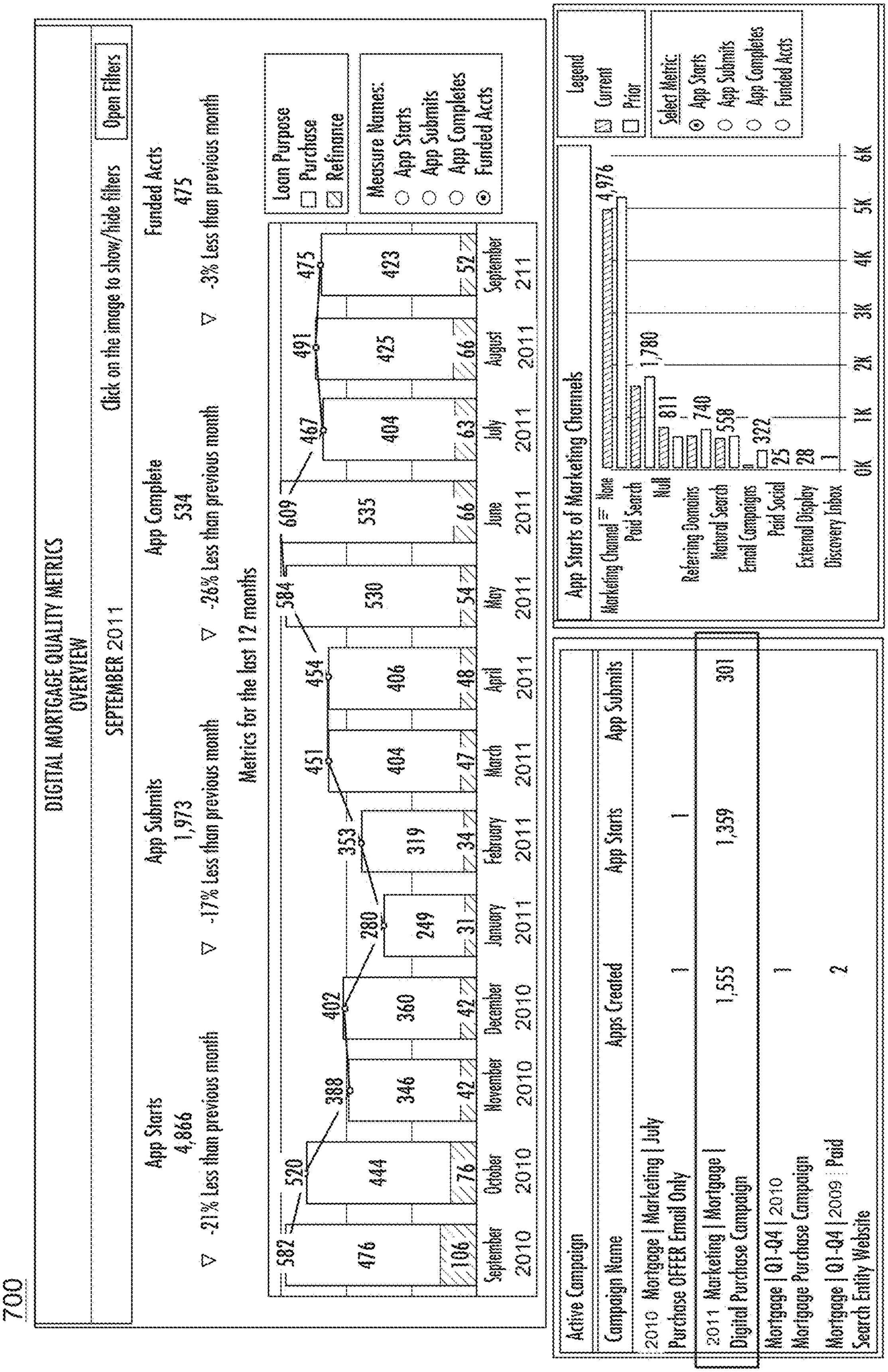
FIG. 7 depicts an example centralized graphical user interface dashboard of graphical elements, according to one embodiment.

FIG. 7 depicts an example centralized graphical user interface dashboard 700 of graphical elements, according to one embodiment. The centralized graphical user interface dashboard 700, provides an example of digital mortgage quality metrics as of September 2021. The number of digital mortgage applications that have been started, submitted, completed, and funded over a predefined period of time are depicted. In particular, a monthly breakdown of mortgage metrics from the months of September 2020 through September 2021 are depicted. In addition, the centralized graphical user interface dashboard 700 depicts the metrics of mortgages for new purchases and for refinancing. The centralized graphical user interface dashboard 700 also depicts metrics associated with various marketing campaigns and the various marketing channels.

Overall, the graphical user interface dashboard 700 acts as a mortgage funnel that utilizes data obtained from web interactions performed by customers and internal systems from branch locations in order to provide a seamless representation of mortgage data. The integrated system eliminates tracking silos in order to reduce redundant analysis and operational metrics associated with mortgage campaigns and market volatility. The streamlined workflow reduces operational costs and facilitate data-driven analysis of initiatives, the return-on-investment in marketing strategies, campaign effectiveness and personalized segmentation.

Figure 8:
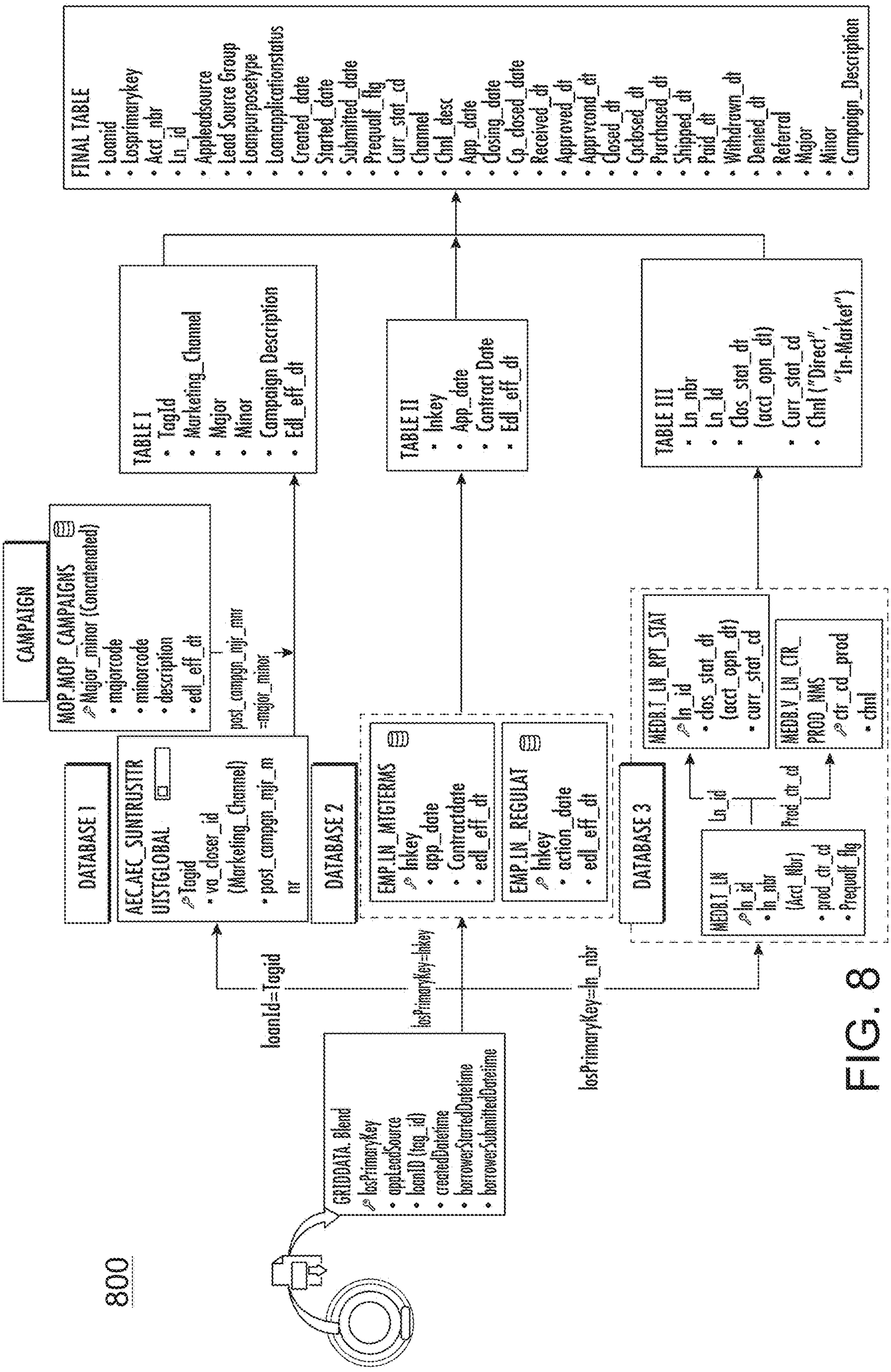
FIG. 8 depicts an example schematic for database integration, in accordance with an embodiment of the present invention.

FIG. 8 depicts an example schematic 800 for database integration, in accordance with an embodiment of the present invention. The schematic 800 depicts the code used to obtain data from each of "Database 1," "Database 2" and "Database 3." Code used to obtain data about various marketing campaigns is also depicted. Tables are generated for each database and the tables are aggregated together to obtain a final table.

Figure 9:
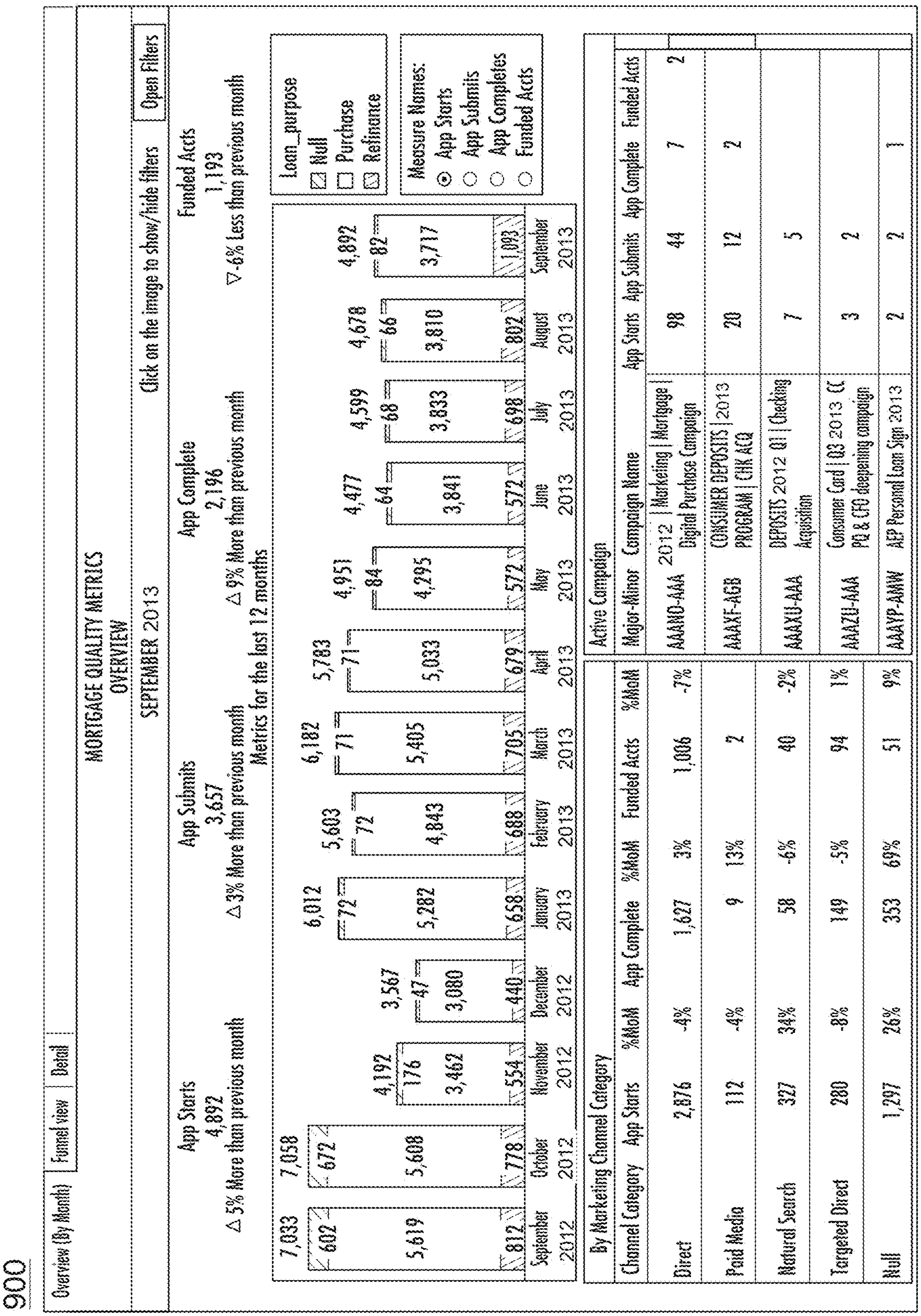
FIG. 9 depicts an example centralized graphical user interface dashboard of graphical elements, in accordance with an embodiment of the present invention.

FIG. 9 depicts an example centralized graphical user interface dashboard 900 of graphical elements, in accordance with an embodiment of the present invention. The centralized graphical user interface dashboard 900, provides an example of an overview by month, based on the overview by month tab being selected, of total mortgage quality metrics including both digital and non-digital mortgage metrics as of September 2023. The number of mortgage applications that have been started, submitted, completed, and funded over a predefined period of time are depicted. In particular, a monthly breakdown of mortgage metrics from the months of September 2022 through September 2023 are depicted. In addition, the centralized graphical user interface dashboard 900 depicts the metrics of mortgages for null metrics, new purchases, and for refinancing. The centralized graphical user interface dashboard 900 also depicts metrics associated with various marketing campaigns and the various marketing channels.

Figure 10:
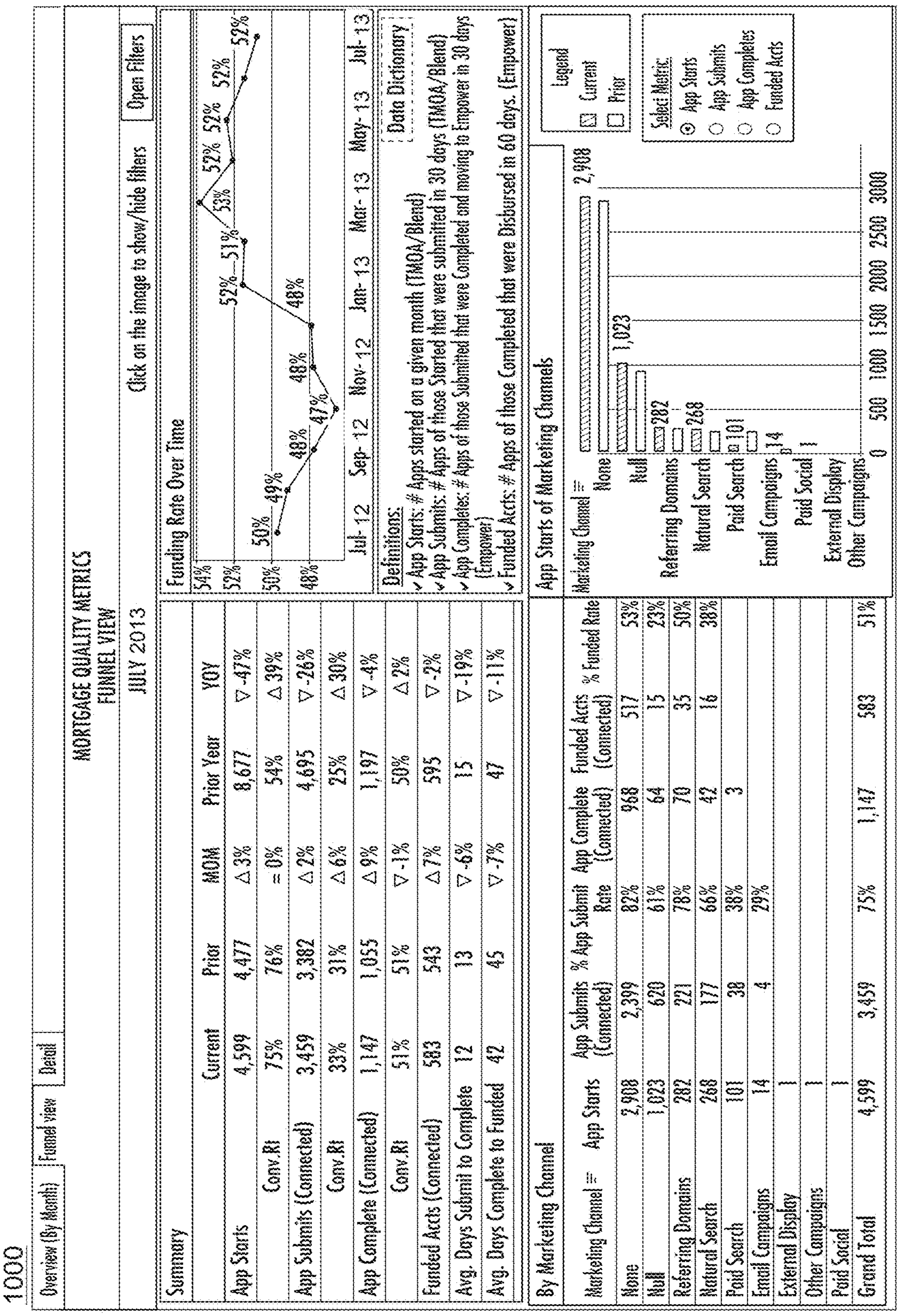
FIG. 10 depicts an example centralized graphical user interface dashboard of graphical elements, in accordance with an embodiment of the present invention.

FIG. 10 depicts an example centralized graphical user interface dashboard 1000 of graphical elements, in accordance with an embodiment of the present invention. The graphical elements include a filtered view, based on selection of the filtered view tab, of various mortgage metrics. In particular, mortgage metrics related to the number of applications funded over time, the number of applications started by marketing channel and other marketing channel metrics are depicted.

FIG. 11 depicts an example centralized graphical user interface dashboard 1100 of graphical elements, in accordance with an embodiment of the present invention. Specifically, the graphical elements include detail, based on a detail tab being selected, of various mortgage metrics for certain marketing channels.

Figure 12:
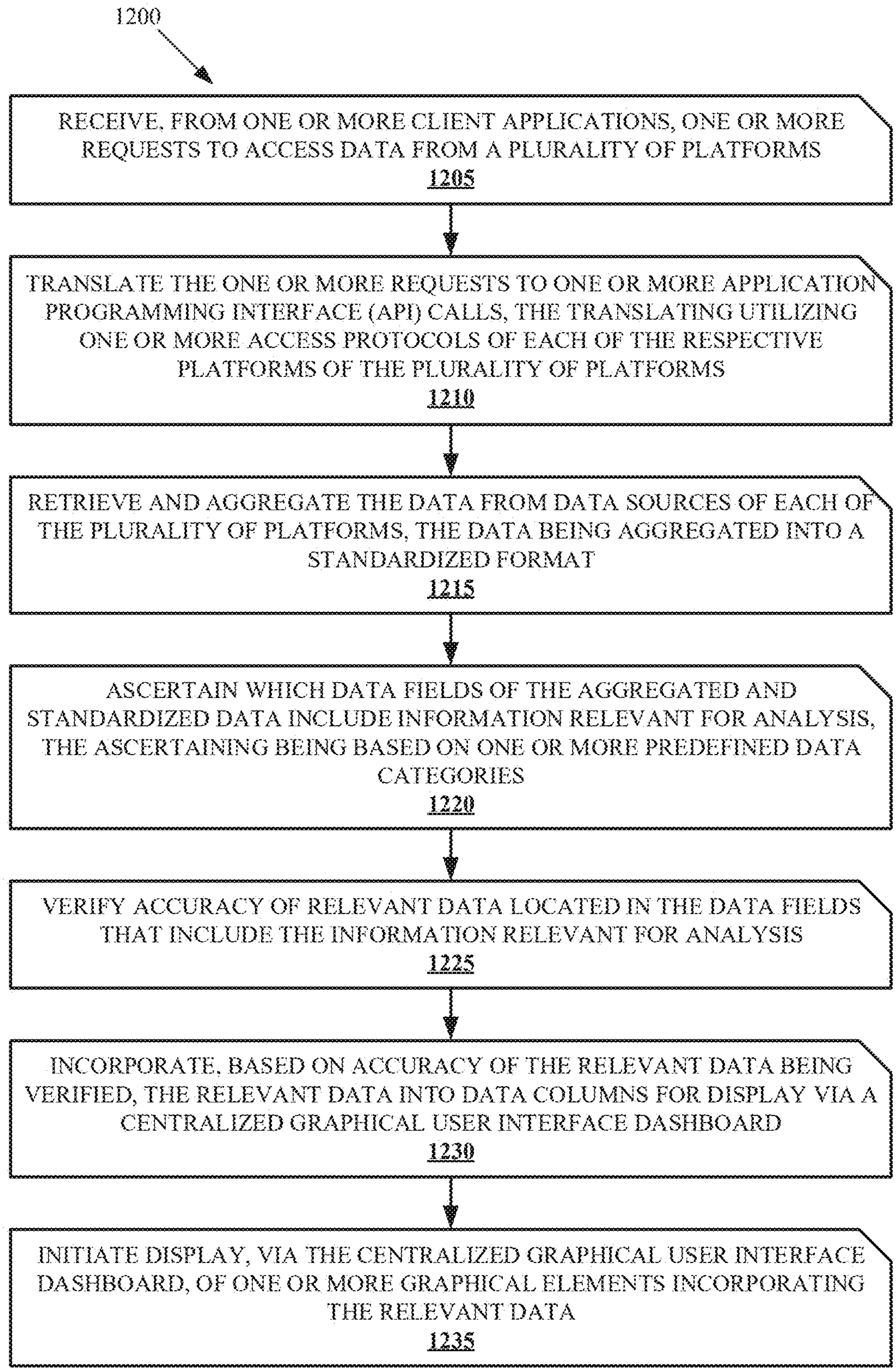
FIG. 12 depicts a block diagram of an example method, in accordance with an embodiment of the present invention.

FIG. 12 depicts a block diagram of an example method 1200, in accordance with an embodiment of the present invention. At block 1205, the system receives, from one or more client applications, one or more requests to access data from a plurality of platforms. In some embodiments, the data include mortgage data, and the plurality of platforms include a digital lending platform, a customer experience management platform, and a mortgage marketing platform. At block 1210, the system translates the one or more requests to one or more application programming interface (API) calls, the translating utilizing one or more access protocols of each of the respective platforms of the plurality of platforms. At block 1215, the system retrieves and aggregates the data from data sources of each of the plurality of platforms, and the data is aggregated into a standardized format. In some embodiments, the system identifies and resolves data conflicts between the data sources of each of the plurality of platforms. At block 1220, the system ascertains which data fields of the aggregated and standardized data include information relevant for analysis, and the ascertaining is based on one or more predefined data categories.

At block 1225, the system verifies the accuracy of relevant data located in the data fields that include the information relevant for analysis. In some embodiments, the system trains, using training data, one or more machine learning models to perform accuracy verification. The training may include inserting the training data into an iterative training and testing loop to predict a target variable. The training includes repeatedly predicting the target variable during each iteration of the training and testing loop, wherein each iteration of the training and testing loop has differing weights applied to one or more nodes of the neural network, each of the differing weights being updated with each iteration of the training and testing loop to reduce error in predicting the target variable, which improves predictability of the target variable and functionality of the neural network. Once trained, the system deploys the trained neural network to perform the verifying of the accuracy of the relevant data. At block 1230, the system incorporates, based on accuracy of the relevant data being verified, the relevant data into data columns for display via a centralized graphical user interface dashboard.

At block 1235, the system initiates display, via the centralized graphical user interface dashboard, of one or more graphical elements incorporating the relevant data. In some embodiments, the centralized graphical user interface dashboard includes a representation of mortgage data metrics separated by month over a predefined period of time. In some embodiments, the centralized graphical user interface dashboard includes a representation of mortgage metrics categorized by marketing channel. In some embodiments, the centralized graphical user interface dashboard includes a representation of mortgage metrics categorized by marketing campaign. In some embodiments, the centralized graphical user interface dashboard includes a representation of digital mortgage applications started. In some embodiments, the centralized graphical user interface dashboard includes a representation of digital mortgage applications submitted. In some embodiments, the centralized graphical user interface dashboard includes a representation of digital mortgage applications completed. In some embodiments, the centralized graphical user interface dashboard includes a representation of digital mortgage applications funded.

Figure 13:
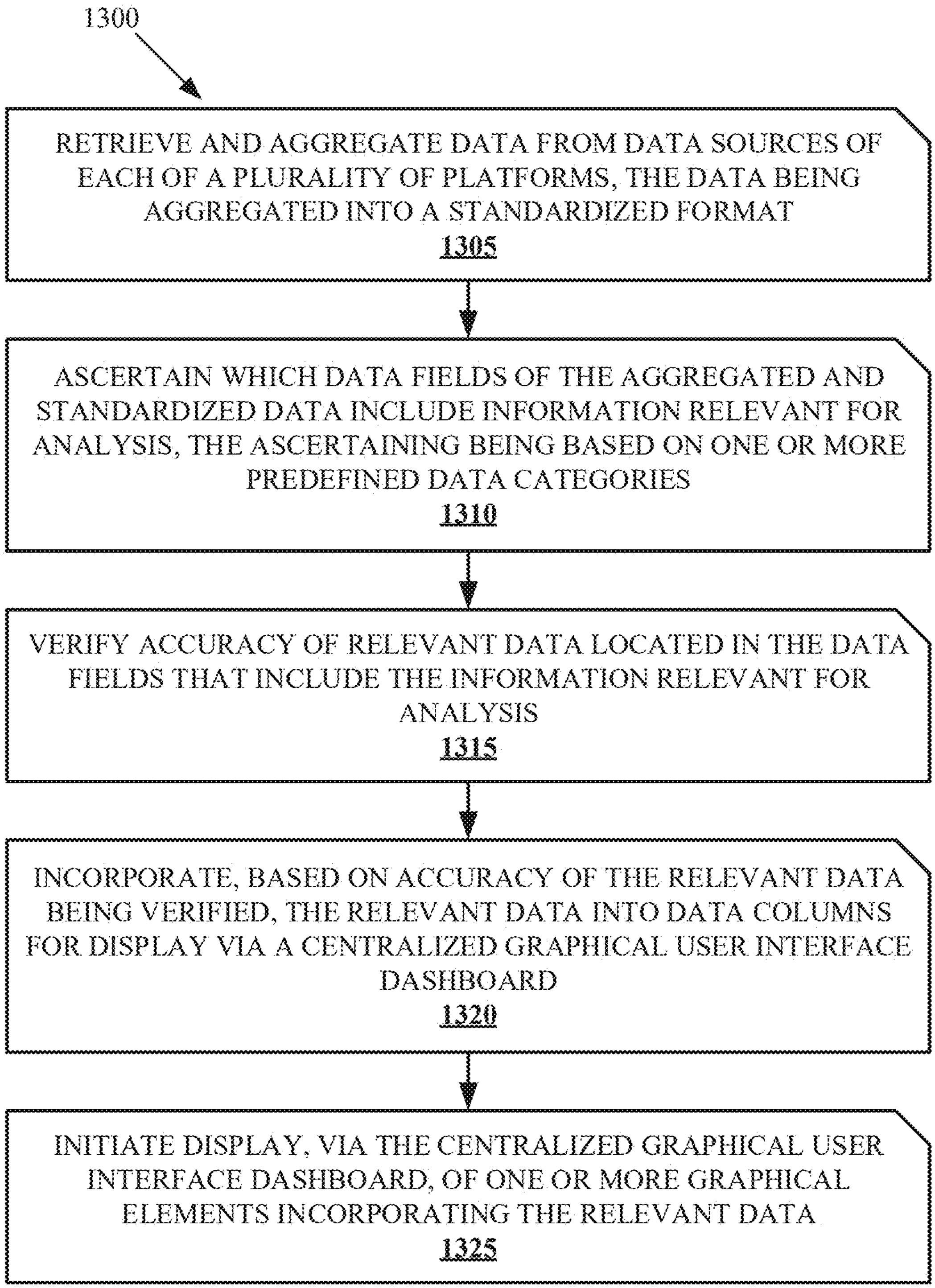
FIG. 13 depicts a block diagram of an example method, in accordance with an embodiment of the present invention.

FIG. 13 depicts a block diagram of an example method 1300, in accordance with an embodiment of the present invention. At block 1305, the system retrieves and aggregates data from data sources of each of a plurality of platforms, the data being aggregated into a standardized format, data include mortgage data and the plurality of platforms include a digital lending platform, a customer experience management platform, and a mortgage marketing platform. At block 1315, the system verifies accuracy of relevant data located in the data fields that include the information relevant for analysis. At block 1320, the system incorporates, based on accuracy of the relevant data being verified, the relevant data into data columns for display via a centralized graphical user interface dashboard. At block 1325, the system initiates display, via the centralized graphical user interface dashboard, of one or more graphical elements incorporating the relevant data. In some embodiments, the centralized graphical user interface dashboard includes a representation of mortgage data metrics separated by month over a predefined period of time. In some embodiments, the centralized graphical user interface dashboard includes a representation of mortgage metrics categorized by marketing channel. In some embodiments, the centralized graphical user interface dashboard includes a representation of mortgage metrics categorized by marketing campaign. In some embodiments, the centralized graphical user interface dashboard includes a representation of at least one selected from the group consisting of digital mortgage applications started, digital mortgage applications submitted, digital mortgage applications completed, and digital mortgage applications funded.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®", "Windows®", "macOS®", "iOS®", "Android®", and the like may be subject to trademark rights in various jurisdictions throughout the world and are used here only in reference to the products or services properly denominated by the marks to the extent that such trademark rights may exist.

What is claimed is:

1. A computing system for database integration facilitating data extraction, the system comprising:
- at least one processor;
- a communication interface communicatively coupled to the at least one processor; and
- a memory device storing executable code that, when executed, causes the at least one processor to:
  - receive, from one or more client applications, one or more requests to access data from a plurality of platforms, wherein at least one platform of the plurality of platforms stores unstructured free-text data and at least one other platform of the plurality of platforms stores structured data, each of the plurality of platforms storing data in a non-standardized format;
  - translate the one or more requests to one or more application programming interface (API) calls, the translating utilizing one or more access protocols of each of the respective platforms of the plurality of platforms;
  - retrieve and aggregate the data from data sources of each of the plurality of platforms, the data being aggregated into a standardized format;
  - ascertain which data fields of the aggregated and standardized data include information relevant for analysis, the ascertaining being based on one or more predefined data categories, the ascertaining utilizing one or more natural language processing models to process the unstructured free-text data obtained from the at least one platform and assign records derived from the unstructured free-text data to one or more of the predefined data categories;
  - train, using training data, a neural network that includes one or more machine learning models that are configured to perform accuracy verification of relevant data, the training including:
    - inserting the training data into an iterative training and testing loop to predict a target variable;
    - repeatedly predicting the target variable during each iteration of the training and testing loop, wherein each iteration of the training and testing loop has differing weights applied to one or more nodes of the neural network, each of the differing weights being updated with each iteration of the training and testing loop to reduce error in predicting the target variable, which improves predictability of the target variable and functionality of the neural network; and
    - deploying the trained neural network configured to perform accuracy verification of the relevant data;
  - verify, via the deployed neural network, accuracy of the relevant data located in the data fields that include the information relevant for analysis, the verifying comprising detecting anomalies in the relevant data fields and excluding anomalous data from display and from retraining of the neural network and blocking a corresponding data source of the anomalous records from subsequent aggregation and training;
  - predict, using a predictive engine that incorporates machine learning using one or more additional machine learning models, one or more processes for formatting the relevant data;
  - incorporate, based on accuracy of the relevant data being verified, the relevant data into data columns for display via a centralized graphical user interface dashboard wherein the relevant data is incorporated into the data columns according to the one or more processes; and
  - initiate display, via the centralized graphical user interface dashboard, of one or more graphical elements incorporating the relevant data.

2. The computing system of claim 1, wherein the data include mortgage data and the plurality of platforms include a digital lending platform, a customer experience management platform, and a mortgage marketing platform.

3. The computing system of claim 1, wherein the centralized graphical user interface dashboard includes a representation of mortgage data metrics separated by month over a predefined period of time.

4. The computing system of claim 1, wherein the centralized graphical user interface dashboard includes a representation of mortgage metrics categorized by marketing channel.

5. The computing system of claim 1, wherein the centralized graphical user interface dashboard includes a representation of mortgage metrics categorized by marketing campaign.

6. The computing system of claim 1, wherein the centralized graphical user interface dashboard includes a representation of digital mortgage applications started.

7. The computing system of claim 1, wherein the centralized graphical user interface dashboard includes a representation of digital mortgage applications submitted.

8. The computing system of claim 1, wherein the centralized graphical user interface dashboard includes a representation of digital mortgage applications completed.

9. The computing system of claim 1, wherein the centralized graphical user interface dashboard includes a representation of digital mortgage applications funded.

10. The computing system of claim 1, wherein the executable code, when executed, further causes the at least one processor to identify and resolve data conflicts between the data sources of each of the plurality of platforms.

11. A computing system, comprising:

at least one processor;

a communication interface communicatively coupled to the at least one processor; and a memory device storing executable code that, when executed, causes the at least one processor to:

retrieve and aggregate data from data sources of each of a plurality of platforms, the data being aggregated into a standardized format, wherein at least one platform of the plurality of platforms stores unstructured free-text data and at least one other platform of the plurality of platforms stores structured data, each of the plurality of platforms storing data in a non-standardized format;

ascertain which data fields of the aggregated and standardized data include information relevant for analysis, the ascertaining being based on one or more predefined data categories, the ascertaining utilizing one or more natural language processing models to process the unstructured free-text data obtained from the at least one platform and assign records derived from the unstructured free-text data to one or more of the predefined data categories;

train, using training data, a neural network that includes one or more machine learning models that are configured to perform accuracy verification of relevant data, the training including:

inserting the training data into an iterative training and testing loop to predict a target variable;

repeatedly predicting the target variable during each iteration of the training and testing loop, wherein each iteration of the training and testing loop has differing weights applied to one or more nodes of the neural network, each of the differing weights being updated with each iteration of the training and testing loop to reduce error in predicting the target variable, which improves predictability of the target variable and functionality of the neural network; and deploying the trained neural network configured to perform accuracy verification of the relevant data;

verify, via the deployed neural network, accuracy of the relevant data located in the data fields that include the information relevant for analysis, the verifying comprising detecting anomalies in the relevant data fields and excluding anomalous data from display and from retraining of the neural network and blocking a corresponding data source of the anomalous records from subsequent aggregation and training;

predict, using a predictive engine that incorporates machine learning using one or more additional machine learning models, one or more processes for formatting the relevant data;

incorporate, based on accuracy of the relevant data being verified, the relevant data into data columns for display via a centralized graphical user interface dashboard wherein the relevant data is incorporated into the data columns according to the one or more processes; and initiate display, via the centralized graphical user interface dashboard, of one or more graphical elements incorporating the relevant data.

12. The computing system of claim 11, wherein the data include mortgage data and the plurality of platforms include a digital lending platform, a customer experience management platform, and a mortgage marketing platform.

13. The computing system of claim 11, wherein the centralized graphical user interface dashboard includes a representation of mortgage data metrics separated by month over a predefined period of time.

14. The computing system of claim 11, wherein the centralized graphical user interface dashboard includes a representation of mortgage metrics categorized by marketing channel.

15. The computing system of claim 11, wherein the centralized graphical user interface dashboard includes a representation of mortgage metrics categorized by marketing campaign.

16. The computing system of claim 11, wherein the centralized graphical user interface dashboard includes a representation of at least one selected from the group consisting of digital mortgage applications started, digital mortgage applications submitted, digital mortgage applications completed, and digital mortgage applications funded.

17. A computer-implemented method, comprising:

receiving, from one or more client applications, one or more requests to access data from a plurality of platforms, wherein at least one platform of the plurality of platforms stores unstructured free-text data and at least one other platform of the plurality of platforms stores structured data, each of the plurality of platforms storing data in a non-standardized format;

translating the one or more requests to one or more application programming interface (API) calls, the translating utilizing one or more access protocols of each of the respective platforms of the plurality of platforms;

retrieving and aggregating the data from data sources of each of the plurality of platforms, the data being aggregated into a standardized format;

ascertaining which data fields of the aggregated and standardized data include information relevant for analysis, the ascertaining being based on one or more predefined data categories, the ascertaining utilizing one or more natural language processing models to process the unstructured free-text data obtained from the at least one platform and assign records derived from the unstructured free-text data to one or more of the predefined data categories;

training, using training data, a neural network that includes one or more machine learning models that are configured to perform accuracy verification of relevant data, the training including:

inserting the training data into an iterative training and testing loop to predict a target variable;

repeatedly predicting the target variable during each iteration of the training and testing loop, wherein each iteration of the training and testing loop has differing weights applied to one or more nodes of the neural network, each of the differing weights being updated with each iteration of the training and testing loop to reduce error in predicting the target variable, which improves predictability of the target variable and functionality of the neural network; and deploying the trained neural network configured to perform accuracy verification of the relevant data;

verifying, via the deployed neural network, accuracy of the relevant data located in the data fields that include the information relevant for analysis, the verifying comprising detecting anomalies in the relevant data fields and excluding anomalous data from display and from retraining of the neural network and blocking a corresponding data source of the anomalous records from subsequent aggregation and training;

predicting, using a predictive engine that incorporates machine learning using one or more additional machine learning models, one or more processes for formatting the relevant data;

incorporating, based on accuracy of the relevant data being verified, the relevant data into data columns for display via a centralized graphical user interface dashboard wherein the relevant data is incorporated into the data columns according to the one or more processes; and initiating display, via the centralized graphical user interface dashboard, of one or more graphical elements incorporating the relevant data.

18. The computer-implemented method of claim 17, wherein the data include mortgage data and the plurality of platforms include a digital lending platform, a customer experience management platform, and a mortgage marketing platform.

19. The computer-implemented method of claim 17, wherein the centralized graphical user interface dashboard includes a representation of mortgage data metrics separated by month over a predefined period of time.

20. The computer-implemented method of claim 17, wherein the centralized graphical user interface dashboard includes a representation of mortgage metrics categorized by marketing campaign.

* * * * *